United States Patent
Fang et al.

(10) Patent No.: US 11,255,787 B2
(45) Date of Patent: Feb. 22, 2022

(54) LAMINATED FLUORESCENT SENSOR COMPRISING A SEALABLE SENSOR HOUSING AND AN OPTICAL SENSING SYSTEM

(71) Applicant: SHAANXI NORMAL UNIVERSITY, Shaanxi (CN)

(72) Inventors: Yu Fang, Shaanxi (CN); Ruijuan Wen, Shaanxi (CN)

(73) Assignee: SHAANXI NORMAL UNIVERSITY, Shaanxi (CN)

( * ) Notice: Subject to any disclaimer, the term of this patent is extended or adjusted under 35 U.S.C. 154(b) by 182 days.

(21) Appl. No.: 16/482,677

(22) PCT Filed: Jul. 6, 2017

(86) PCT No.: PCT/CN2017/092101
§ 371 (c)(1),
(2) Date: Jul. 31, 2019

(87) PCT Pub. No.: WO2018/176677
PCT Pub. Date: Oct. 4, 2018

(65) Prior Publication Data
US 2020/0011794 A1  Jan. 9, 2020

(30) Foreign Application Priority Data

Apr. 1, 2017 (CN) .......................... 201710214252.8

(51) Int. Cl.
*G01N 21/01* (2006.01)
*G01N 21/64* (2006.01)
(Continued)

(52) U.S. Cl.
CPC .......... *G01N 21/645* (2013.01); *G01N 21/01* (2013.01); *G01N 21/64* (2013.01); *G01T 1/2006* (2013.01);
(Continued)

(58) Field of Classification Search
CPC .......... G01N 21/01; G01N 2021/0106; G01N 2021/0112; G01N 2021/1765;
(Continued)

(56) References Cited

U.S. PATENT DOCUMENTS 4,301,372 A * 11/1981 Giering ................ G01N 21/645
250/461.1
6,809,859 B2 * 10/2004 Erdogan ................ G02B 5/285
359/359

(Continued)

FOREIGN PATENT DOCUMENTS

CN         105866091 A  *  8/2016  ............. G01N 21/01

*Primary Examiner* — Allen C. Ho

(57) ABSTRACT

A laminated fluorescent sensor includes a sealable sensor housing and an optical sensing system embedded inside the sealable sensor housing. The optical sensing system includes a light source (7), a short wave pass filter (8), an air chamber (10), a sensing unit, a long wave pass filter set (12) and an optical signal collecting unit from top to bottom all of which are coaxially set. The optical signal collecting unit is connected with a signal processing system (14); the sealable sensor housing has air inlets (2, 201) and an air pumping port (3), the air inlets (2, 201) are communicated with the air chamber (10) through an air intake passage, the air chamber (10) is communicated with the air pumping port (3) through an air pumping passage.

9 Claims, 3 Drawing Sheets

(51) Int. Cl.
*G01T 1/20* (2006.01)
*G01N 21/17* (2006.01)

(52) U.S. Cl.
CPC ........ *G01T 1/2018* (2013.01); *G01T 1/20185* (2020.05); *G01T 1/20186* (2020.05); *G01T 1/20187* (2020.05); *G01T 1/20188* (2020.05); *G01N 2021/0106* (2013.01); *G01N 2021/0112* (2013.01); *G01N 2021/177* (2013.01); *G01N 2021/1765* (2013.01); *G01N 2021/1768* (2013.01); *G01N 2021/1772* (2013.01); *G01N 2021/1774* (2013.01); *G01N 2021/1776* (2013.01); *G01N 2021/1778* (2013.01); *G01N 2021/6463* (2013.01); *G01N 2021/6471* (2013.01); *G01N 2021/6473* (2013.01); *G01N 2201/062* (2013.01)

(58) Field of Classification Search
CPC ..... G01N 2021/1768; G01N 2021/177; G01N 2021/1772; G01N 2021/1774; G01N 2021/1776; G01N 2021/1778; G01N 21/64; G01N 2021/6463; G01N 2021/6471; G01N 2021/6473; G01T 1/2006; G01T 1/2018; G01T 1/20185; G01T 1/20186; G01T 1/20187; G01T 1/20188
USPC ....................................... 250/458.1
See application file for complete search history.

(56) References Cited

U.S. PATENT DOCUMENTS

| | | | | |
|---|---|---|---|---|
| 7,050,224 | B2* | 5/2006 | Kawamata | G02B 21/16 356/417 |
| 7,453,568 | B2* | 11/2008 | Kawamata | A61B 1/043 250/458.1 |
| 8,300,313 | B2* | 10/2012 | Pradhan | G01J 3/10 359/589 |
| 8,441,710 | B2* | 5/2013 | Wang | G02B 27/288 359/290 |
| 9,304,237 | B1* | 4/2016 | Wang | G02B 5/288 |
| 10,564,412 | B2* | 2/2020 | Nielsen | G02B 5/20 |

* cited by examiner

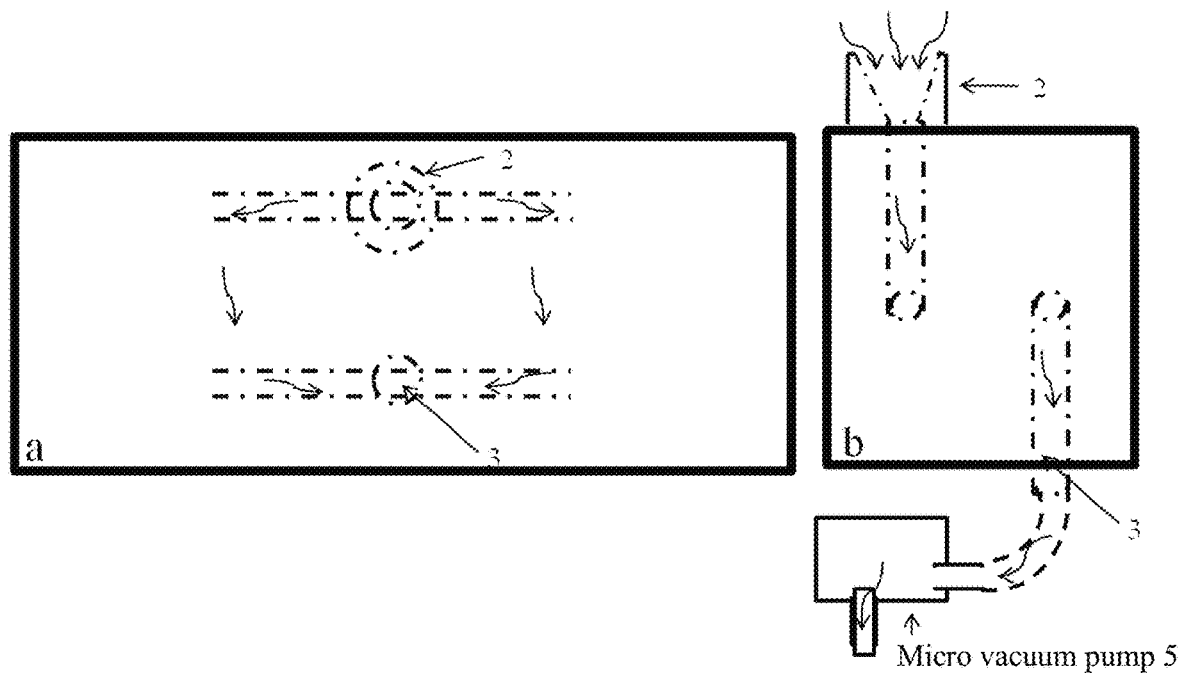
Fig. 3(a)  Fig. 3(b)
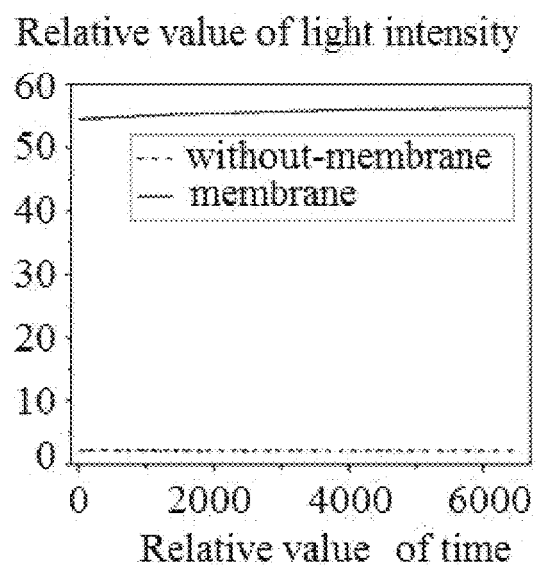
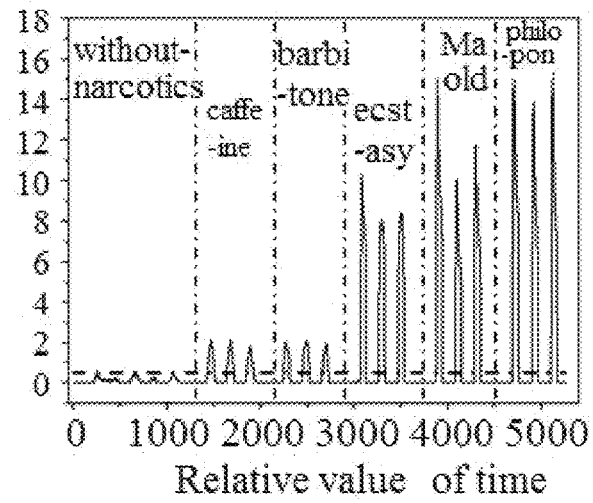
Fig. 4

LAMINATED FLUORESCENT SENSOR COMPRISING A SEALABLE SENSOR HOUSING AND AN OPTICAL SENSING SYSTEM

CROSS REFERENCE OF RELATED APPLICATION

This is a U.S. National Stage under 35 U.S.C 371 of the International Application PCT/CN2017/092101, filed Jul. 6, 2017, which claims priority under 35 U.S.C. 119(a-d) to CN 201710214252.8, filed Apr. 1, 2017.

BACKGROUND OF THE PRESENT INVENTION

Field of Invention

The present invention relates to the field of fluorescence sensing technology, and more particularly to a laminated fluorescent sensor.

Description of Related Arts

Fluorescence sensing refers to using light with a certain wavelength range to illuminate a sensitive unit with a special recognition function to excite fluorescence. When the corresponding detected object contacts the sensitive unit and interacts, the fluorescence intensity of the sensitive unit is enhanced or quenched, the fluorescence lifetime is prolonged or reduced, so that qualitative or quantitative measurement of the detected object is able to be achieved by monitoring changes in the fluorescent signal. This technique is often used for biological and chemical sensing. At present, in order to obtain the higher signal-to-noise ratio (SNR) of light intensity to improve the detect sensitivity, the excitation light path and the signal light path in some sensors on the market are perpendicular or at a certain angle to each other, which inevitably increases the distance between the sensing element and the optical signal collecting element, so that it is necessary to introduce a lens group to increase the collection efficiency, thus the entire sensor is increased in volume. In addition, structurally, there are also strict requirements on the angle and position layout of optical elements such as lenses, which greatly limits the integration and array of sensor. In practice, a fluorescent sensor is also able to be constructed using an optical fiber as a propagation medium for excitation light and signal light. However, the cross-sectional area of the optical fiber is generally only a few hundred micrometers, and the collection range of the optical signal is limited, so that it has to improve the signal-to-noise ratio through a lens or even multiple sets of filters, which complicates the overall structure of the sensor. This is why fiber-optic fluorescent sensors with good performance are generally more expensive. Therefore, it is necessary to develop a fluorescent sensor that has the advantages of stable structure, high signal-to-noise ratio, small size, and easy arraying.

SUMMARY OF THE PRESENT INVENTION

An object of the present invention is to overcome the problems in the prior art and to provide a laminated fluorescent sensor which has high signal-to-noise ratio of light intensity and is easy to be arrayed for simultaneously detecting two or more kinds of detected objects.

To achieve the above object, the present invention adopts a technical solution as follows.

A laminated fluorescent sensor comprises a sealable sensor housing and an optical sensing system embedded inside the sealable sensor housing, wherein: the optical sensing system comprises a light source, a short wave pass filter, an air chamber, a sensing unit, a long wave pass filter set and an optical signal collecting unit from top to bottom all of which are coaxially set; the optical signal collecting unit is connected with the signal processing system; the sealable sensor housing has an air inlet and an air pumping port, the air inlet is communicated with the air chamber through an air intake passage, the air chamber is communicated with the air pumping port through an air pumping passage.

Preferably, the light source is a straw-hat-shaped LED (light emitting diode) lamp, a bullet-shaped LED lamp or a patch-type LED lamp; a divergence angle of the light source is in a range of 7 to 30 degrees.

Preferably, the sealable sensor housing comprises an upper housing and a lower housing, wherein the upper housing is embedded inside the lower housing, the sealable sensor housing has a threaded hole for communicating the upper housing with the lower housing, a screw is installed within the threaded hole; the light source is fixed to a light source holder, the light source holder and the short wave pass filter are embedded inside the upper housing; the sensing unit, the long wave pass filter set and the optical signal collecting unit are embedded inside the lower housing, the signal processing system and a bottom of the lower housing are sealed.

Preferably, the optical signal collecting unit is a PIN-type photodiode.

Preferably, a transmittance of the short wave pass filter is larger than 30%, an OD (optical density) thereof is in a range of 4 to 6.

Preferably, the long wave pass filter set comprises a narrow band filter and a long wave pass filter, or the long wave pass filter set comprises multiple misaligned narrow band filters, a thickness of the long wave pass filter set is in a range of 2 to 5 mm.

Preferably, an angle between an outlet of the air intake passage and the sensing unit is in a range of 10 to 50 degrees, an angle between an inlet of the air pumping passage and the sensing unit is in a range of 10 to 50 degrees, or the outlet of the air intake passage and the inlet of the air pumping passage are provided 0.2 to 1 mm above a tangential direction of an edge of the sensing unit.

Preferably, when there are multiple optical sensing systems, the multiple optical sensing systems are embedded inside the sealable sensor housing in parallel, the air inlet and the air pumping port are respectively provided at two sides of the air chamber.

Preferably, the air pumping port is connected with a micro vacuum pump, a transparent optical window is provided between the short wave pass filter and the air chamber.

Preferably, the sensing unit is a fluorescent sensing film, a volume of the air chamber corresponding to the fluorescent sensing film with a diameter of 10 mm is in a range of 50 to 500 $mm^3$.

Compared with the prior art, the present invention has beneficial effects as follows.

Related optical components of the laminated fluorescent sensor provided by the present invention are only the light source, the filters and the optical signal collecting unit. Through coaxially setting the excitation light source, the short wave pass filter, the sensing unit, the long wave pass filter set and the optical signal collecting unit, a simple and stable laminated structure is formed. Under the premise of ensuring the signal-to-noise ratio of light intensity, the response rate and the selectivity, the length, width and height of the laminated fluorescent sensor are controlled to be within 2 cm. The laminated fluorescent sensor is smaller in volume and easy to be arrayed to simultaneously detect two or more detected objects. Moreover, the coaxial setting shortens the distance between the light source and the sensing unit, which facilitates controlling the range of spot spread, so as to reduce the intensity of excitation light needed by the sensing unit. There is almost only a spacing of the long wave pass filter set between the light signal collecting unit and the sensing unit, ensuring the collection efficiency of fluorescence. The filtering ability of the long wave pass filter set is 1 to 2 orders of magnitude higher than that of the conventional long-pass narrow-band fluorescence filter, which not only reduces the manufacturing cost of the filter, but also causes that fluorescence emitted by the sensing unit is only a few thousandth or less of the LED excitation light, and moreover, under the influence of various stray light such as infrared tail and frequency doubling peak of the light source, the SNR of light intensity is obtained as same as or even higher than that of the conventional sensor. The sealable sensor housing provided by the present invention is sealable to ensure airtight environment and optical conditions required for sensing and detecting. The present invention has a high signal-to-noise ratio, is applicable in quick detection of micro-trace chemicals including but not limited to explosives and narcotics, provides great detection effects, has distinctly distinguishable signal responses to objects not being detected and to objects being detected, and provides stable and accurate detection.

Further, in the present invention, the shape and the divergence angle of the light source are controlled, and simultaneously, the optical elements are coaxially set, which facilitates improving the signal-to-noise of light intensity and the excitation efficiency. The light intensity irradiated on the sensing unit of the present invention only needs 5 to 30 μW, compared with 100 μW or more required by a conventional sensor with a certain angle between the light source and the detection unit, the present invention greatly reduces the photo bleaching and photo damage of the excitation light to the sensing unit.

Further, the present invention comprises the upper housing and the lower housing, which facilitates installing the components. Moreover, through the installation manner, that is, the matching of the sealable sensor housing and components of the optical sensing system in size and the stepped distribution of components, the entire laminated fluorescent sensor achieves the airtight environment and the optical condition required by sensing without using a rubber gasket, and is excellent in vibration resistance and impact resistance.

Further, the present invention ensures the cutoff of the fluorescent emission band of the sensing unit by controlling the transmittance and OD value of the short wave pass filter.

Further, the present invention comprises a long wave pass filter set which matches the wavelength distribution range of the excitation light source and the fluorescence emission range of the sensing film, so that the signal-to-noise ratio of light intensity of the sensor is improved and the cost is saved, and also the thickness of the long wave pass filter set is controlled in a range of 2 to 5 mm to reduce the volume of the sensor.

Further, in the present invention, an angle or a certain distance between the outlet of the air inlet passage and the sensing unit is provided, an angle or a certain distance between the inlet of the air pumping passage and the sensing unit is also provided, so as to prevent the impact of the airflow from damaging the sensing unit, and at the same time avoid blocking the flow of airflow on the surface of the sensing unit.

Further, the present invention realizes a highly integrated array laminated sensor by providing a plurality of combinations of air inlets and air pumping ports, and simultaneously or alternately detecting various types of substances without interfering with each other.

Further, through the optical window, the present invention is able to prevent the short wave pass filter from being contaminated by the gas to be detected.

Further, in the present invention, the fluidity of the gas to be detected on the surface of the fluorescence sensing film, the size of the air passage, and the sensitivity of the sensor itself are not affected by controlling the volume of the air chamber corresponding to the fluorescent sensing film.

BRIEF DESCRIPTION OF THE DRAWINGS

FIG. 3(a) is a top view of an air passage unit of the double-laminated fluorescent sensor.

FIG. 3(b) is a right view of the air passage unit of the double-laminated fluorescent sensor.

FIG. 4 is a test result chart of detecting several common narcotics by using the laminated fluorescent sensor according to a first embodiment of the present invention.

Figure 1:
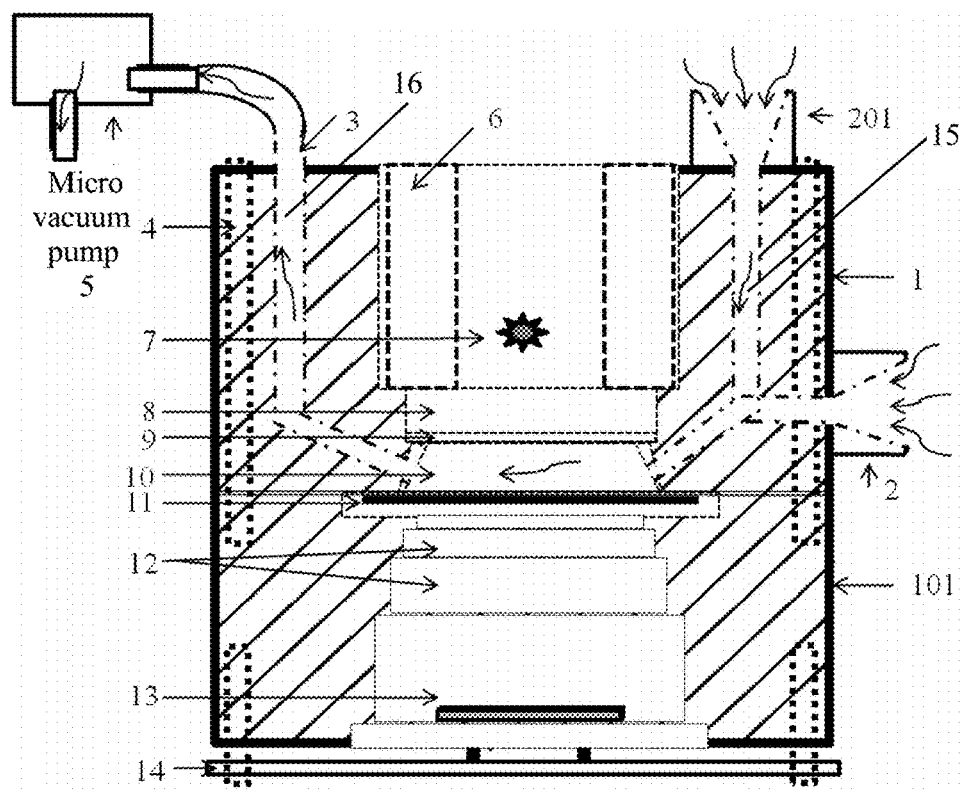
FIG. 1 is a structurally schematic view of a laminated fluorescent sensor provided by the present invention.

In the drawings, 1: upper housing; 101: lower housing; 2: first air inlet; 201: second air inlet; 3: air pumping port; 4: threaded hole; 5: micro vacuum pump; 6: light source holder; 7: light source; 8: short wave pass filter; 9: optical window; 10: air chamber; 11: sensing unit; 12: long wave pass filter set; 13: optical signal collecting unit; 14: signal processing system; 15: air intake passage; 16: air pumping passage.

DETAILED DESCRIPTION OF THE PREFERRED EMBODIMENT

The present invention will be further described in detail with accompanying drawings as follows. In the present invention, relevant directions are defined based on that the fluorescent sensing film of FIG. 1 is horizontally disposed, and the first air inlet is located at the right side, which is only intended to describe more clearly rather than limiting the present invention, for example, the air inlet may actually be located at any side of the upper housing; according to the condition of the gas to be detected, the sensor provided by the present invention is able to be turned over or inverted, that is to say, the fluorescent sensing film is not necessarily in a horizontal state when in use.

Related technical terms and other descriptions of the laminated fluorescent sensor provided by the present invention are as follows. The laminated structure of the present invention refers to a special structure wherein an excitation light source, a short wave pass filter, a sensing unit, a long wave pass filter set, and an optical signal collecting unit are coaxially set.

The signal-to-noise ratio of light intensity refers to the ratio of the relative values of the light intensity of the laminated fluorescent sensor with the sensing film and without the sensing film; the response rate refers to the response time of the sensor to the detected object; The selectivity refers to the distinguishability when the laminated sensor detects the detected object and the non-detected object.

Figure 2:
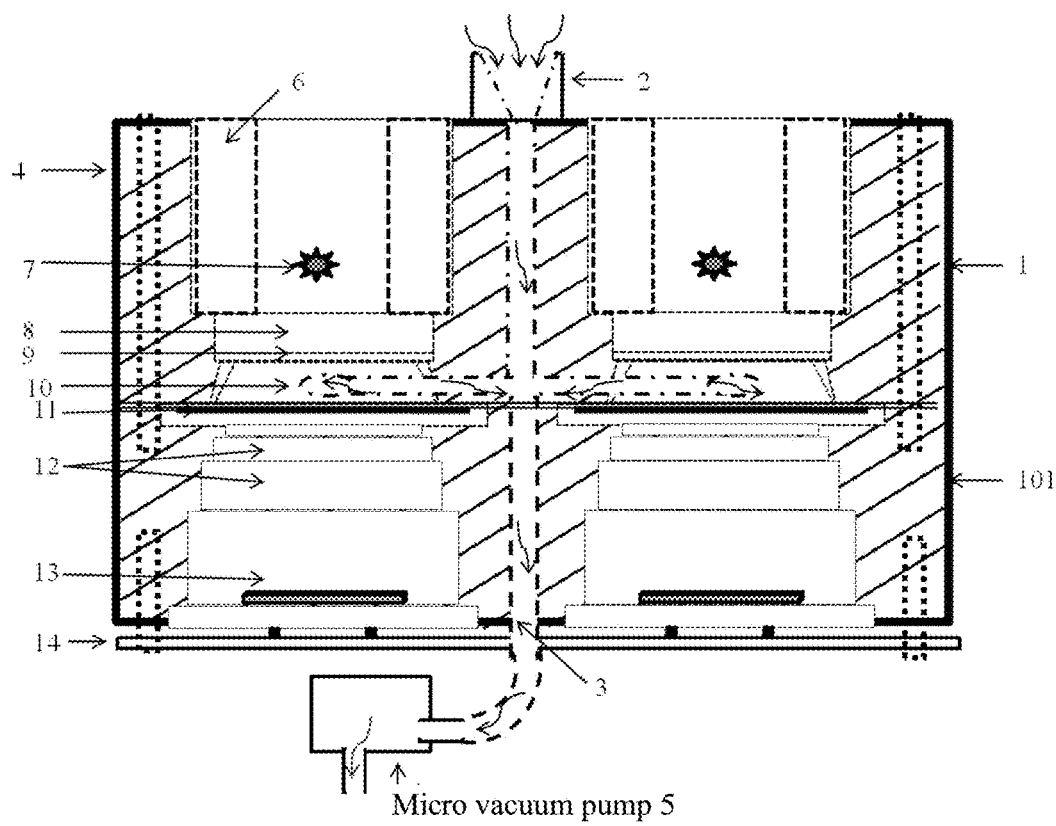
FIG. 2 is a structurally schematic view of a double-laminated fluorescent sensor provided by the present invention.

Referring to FIGS. 1 and 2, a laminated fluorescent sensor provided by the present invention comprises a sealable sensor housing and at least one optical sensing system disposed in the sealable sensor housing, when there are multiple optical sensing systems, the multiple optical sensing systems are disposed in the sealable sensor housing in parallel. The sealable sensor housing comprises an upper housing 1 and a lower housing 101, wherein: the sealable sensor housing has multiple threaded holes 4 for communicating the upper housing 1 with the lower housing 101, screws are respectively installed into the multiple thread holes 4, an engaged structure is disposed between the upper housing 1 and the lower housing 101, the upper housing 1 is fixedly connected with the lower housing 101 through the engaged structure and the screws. The optical sensing system is embedded inside the sealable sensor housing. Through the accurate engaged structure and the screws, airtight environment and optical conditions required by sensing and detecting are formed.

The optical sensing system comprises a light source 7, a short wave pass filter 8, an optical window 9, an air chamber 10, a sensing unit 11, a long wave pass filter set 12, an optical signal collecting unit 13 and a signal processing system 14 connected with the optical signal collecting unit 13. The optical signal collecting unit 13 is embodied as a photodiode. The sealable sensor housing has an air passage unit, air inlets and an air pumping port 3, wherein the air passage unit comprises an air intake passage 15 and an air pumping passage 16. The sensing unit 1 is embodied as a fluorescence sensing film. The air passage unit of the sealable sensor housing and the air chamber 10 are designed as a seamless connection for reducing a loss of detected substance vapor into the fluorescence sensing film. The air intake passage and the air pumping passage are respectively distributed at two sides of the air chamber 10 and communicated with the air chamber 10, the air intake passage is communicated with the air inlets which are funnel-shaped, the air pumping passage is communicated with the air pumping port 3, the air pumping port 3 is communicated with a micro vacuum pump 5.

The sealable sensor housing comprises the upper housing 1 and the lower housing 101, wherein: the light source 7 and the short wave pass filter 8 are installed within the upper housing 1, the upper housing 1 is configured to define the air chamber 10 and the air passage unit, the light source 7 is fixedly installed within the upper housing 1 through a light source holder 6; the fluorescent sensing film, the long wave pass filter set 12 and the photodiode are installed within the lower housing 101, the signal processing system 14 and a bottom of the lower housing 101 are sealed; multiple stepped holes are provided within the upper housing 1 and the lower housing 101 for installing components, so that the components are able to be embedded within the upper housing 1 and the lower housing 101.

An angle between the air intake passage near the fluorescent sensing film and a sensor film substrate, or an angle between the air pumping passage near the fluorescent sensing film and the sensor film substrate is in a range of 10 to 50 degrees. Or, the air intake passage near the fluorescent sensing film, and the air pumping passage near the fluorescent sensing film are provided 0.2 to 1 mm above a tangential direction of an edge of the sensing film substrate. The air intake passage and the air pumping passage are unable to face against the fluorescence sensing film to prevent the impact of the airflow from damaging the fluorescence sensing film; and the air intake passage and the air pumping passage are also unable to be close to the fluorescence sensing film to block the flow of the airflow on a surface of the fluorescence sensing film. The air inlets and the air pumping port 3, all of which are communicated with an external environment, are able to be designed on any side of the upper housing 1 as needed, which just ensures that the air passage unit allows gas to be detected to pass through the air chamber.

For example, when there is one optical sensing system, two air inlets are respectively provided at two positions, wherein: a first air inlet 2 is provided at a side wall of the upper housing 1, a second air inlet 201 is provided at a top end of the upper housing 1, the air pumping port 3 is provided at the top end of the upper housing 1, the first and second air inlets and the air pumping port 3 are respectively provided at a left side and a right side of the air chamber 10, referring to FIG. 3(a) and FIG. 3(b); where there are two optical sensing systems, air inlets are provided at a front side of a top portion of the upper housing 1, the air pumping port 3 is provided at a rear side of a bottom portion of the upper housing 1, and all of the air inlets and the air pumping port 3 are provided between the two optical sensing systems.

The light source 7 acts as an excitation source of the fluorescence sensing film and is embodied as an LED (light emitting diode) lamp which are able to be a straw-hat-shaped LED lamp, a bullet-shaped LED lamp or a patch-type LED lamp. A main emission wavelength range of the light source 7 is matched with an optimal excitation waveband of the fluorescent sensing film as much as possible. A divergence angle of the light source 7 is in a range of 7 to 30 degrees.

A distance between the short wave pass filter 8 and the light source 7 is within 3 mm, which is based on a principle of not losing the effect of the short wave pass filter 8. The short wave pass filter 8 has a transmittance of more than 30% for excitation light, and has a large cutoff depth to a fluorescent emission band of the fluorescent sensing film. Generally, an OD (optical density) of the short wave pass filter 8 is in a range of 4 to 6.

The optical window 9 is made from a light-transmitting material for preventing the short wave pass filter 8 from being contaminated by the gas to be detected.

A volume of the air chamber 10 of the sensor is determined by not affecting the fluidity of the gas to be detected on a surface of the fluorescent sensing film, not affecting a size of the air passage unit, and a sensitivity of the sensor itself, and the volume of the air chamber 10 corresponding to the fluorescent sensing film with a diameter of 10 mm is in a range of 50 to 500 $mm^3$.

There are many optical substrates available for the fluorescent sensing film. The main principle is that the optical substrates have no interference to the sensing film or the fluorescent detection band, and are optical media that are able to conduct fluorescence, such as glass. There is no requirement for the smoothness and flatness of the optical substrate. The sensing material is coated or chemically bonded to the optical substrate to form a diaphragm for quick replacement.

The long wave pass filter set 12 is configured to filter out the excitation light and the stray light such as the doublefrequency light and the infrared tail on the sensing film. Generally, the intensity of the excitation light is 3 to 10 orders of magnitude larger than the intensity of the fluorescence, and even larger. If the signal-to-noise ratio of light intensity is improved by a single-type filter, the OD value generally needs to be 6-8, but the increase of the OD value causes the decrease in the transmittance of the fluorescent band, and also increases the thickness of the filter and the manufacturing cost. The long wave pass filter set 12 provided by the present invention is designed according to the wavelength distribution range of the specific excitation light source and the fluorescent emission range of the sensing film. The long wave pass filter set comprises a narrow band filter and a long wave pass filter, or the long wave pass filter set comprises multiple misaligned narrow band filters for improving the signal-to-noise of light intensity of the sensor and saving cost. Moreover, the thickness of the long wave pass filter set 12 is controlled to be in a range of 2 to 5 mm.

The narrow band LED lamp has a main light emitting band, but there are some stray light near the main light emitting band. Generally, only the short wave pass filter is unable to achieve the filtering effect, so the long wave pass filter set is required to assist the filtering. For a sensing unit with large Stokes displacement, a narrow band filter and a long wave pass filter are used to achieve the filtering effect, such as the excitation light is in a range of 430 nm to 500 nm and the fluorescent emission is in a range of 600 nm to 800 nm, the selected long wave pass filter set comprises a 650 nm narrow band filter and a 350 nm-600 nm cut-off long wave pass filter. According to the experimental verification, the narrow band filter is close to the sensing unit. For a sensing unit with small Stokes displacement and the excitation light in the ultraviolet band, such as between 300 nm and 400 nm, the fluorescent emission waveband is between 380 nm and 470 nm, the misaligned narrow band filters are suggested to be used, wherein the misaligned narrow band filters are a narrow band filter with a bandwidth of 20 nm and a wavelength of 410 nm, and a narrow band filter with a bandwidth of 10 nm and a wavelength of 415 nm. According to experimental verification, a narrow band filter with a short wavelength is required to be close to the sensing unit.

A gap of 0.2 to 0.6 mm is provided between the long wave pass filter set 12 and the fluorescent sensing film for fixing the filter, and a distance between the long wave pass filter set 12 and the photodiode is in a range of 0 to 1 mm.

The photodiode is a PIN-type photodiode.

Under the premise of ensuring the signal-to-noise ratio of light intensity, the response rate and the selectivity, the length, width and height of the laminated fluorescent sensor are controlled to be within 2 cm. Relevant optical components are only the optical source 7, the filters, and the photosensitive member, so that the sensor is simple in structure and easy to install, and is able to be expanded to an arrayed sensor which is able to simultaneously detect multiple types of substances.

The gas to be detected enters from the inlet of the air intake passage, passes through the air chamber 10, and is discharged from the air pumping port 3. The light emitted from the light source 7 is irradiated onto the fluorescent sensing film by the short wave pass filter 8 to generate fluorescence, and the excitation light and the stray light is filtered out by the long wave pass filter set 12, and then is received by the PIN-type photodiode.

The aperture and thickness of the optical lens mounted inside the sealable sensor housing are the same as the size of the optical lens itself. Components of the optical sensing system are limited in size for limiting the scope of activities, so as to ensure the vibration resistance, impact force and shading conditions required by fluorescence sensing of the optical components.

First Embodiment

As shown in FIG. 1, a single laminated fluorescent sensor comprises a sensor housing comprising an upper housing 1 and a lower housing 101, and an optical sensing system disposed within the sensor housing. Optical components of the optical sensing system are embedded into an interior of the sensor housing in a specific order, and then the upper housing 1, the lower housing and a signal processing system 14 connected with the lower housing 101 are fixed through threaded holes 4 and screws, so that a complete laminated fluorescent sensor is formed. Light emitted by the light source 7 is diffused by the short wave pass filter 8 and the air chamber 10, and then irradiated onto the fluorescent sensing film to generate fluorescence, and the excitation light and the stray light is filtered out by the long wave pass filter set 12, and then is received by the PIN-type photodiode, the photodiode performs photoelectric signal conversion and transmits an electrical signal to the signal processing system 14, the signal processing system 14 monitors the intensity change of the fluorescence emitted from the fluorescent sensing film in real time. When the vapor of the substance to be detected reaches the air chamber 10 via the first air inlet 2 or the second air inlet 201, and reversibly interacts with the fluorescent sensing film, the fluorescence intensity emitted by the fluorescent sensing film is enhanced or weakened. The test result is determined by the magnitude of the change in fluorescence intensity.

As shown in FIG. 4, the laminated fluorescent sensor is used to detect several common narcotics. A left picture shows a signal-to-noise ratio of light intensity of the laminated fluorescent sensor; the signal-to-noise ratio of the laminated sensor reaches above 30 by coating 10 μL fluorescent sensing film with a concentration of 0.05% onto a glass piece with a diameter of 15 mm, that is, the signal-to-noise ratio of the laminated narcotic sensor reaches above 30; a right picture shows that the substance to be detected is collected every 30 seconds, a sampling time is controlled in a range of 1 to 5 seconds, a response time of the sensor is almost synchronized with the sampling time. In FIG. 4, a signal response distinguishability of the laminated sensor is compared when a non-detected object and a detected object is detected, wherein signals are clearly distinguished and positioned stably and accurately.

The light intensity of the laminated fluorescent sensor on the fluorescent sensing film is only in a range of 5 to 30 μW. Compared with 100 μW or above (tested on the surface of the sensing film using a Thorlabs model PM100D power meter) which is required by a conventional sensor with a certain angle between the light source and the detection unit, the photobleaching and photodamage of the fluorescent sensing film by the excitation light are greatly reduced.

Second Embodiment

In practice, it is often necessary to simultaneously detect two or more types of objects to be detected, such as explosives and narcotics. As shown in FIG. 2, a double-laminated fluorescent sensor is illustrated, which comprises an upper housing 1, a lower housing 101 and two optical sensing systems. According to different types of objects to be detected, corresponding fluorescent sensing films and corresponding optical components are selected, the optical components of the optical sensing system are embedded into the exterior of the sensor housing in a specific order, and then the upper housing 1 and the lower housing 101, the lower housing 101 and the signal processing system 14 are fixed through threaded holes 4 and screws, so that a complete double-laminated fluorescent sensor is formed. Light emitted by the light source 7 is diffused by the short wavelength pass filter 8 and the air chamber 10, and then irradiated onto the fluorescent sensing film to generate fluorescence, and then the excitation light and the stray light is filtered out by the long wave pass filter set 12, and then is received by the PIN-type photodiode, the signal processing system 14 monitors the intensity change of the fluorescence emitted from the fluorescent sensing film in real time. When the vapor of the substance to be detected is divided into two parts via the first air inlet 2 for respectively entering into the air chambers 10 of the double-laminated fluorescent sensor, and then respectively reversibly interact with the fluorescent sensing films, the fluorescence intensity emitted by the fluorescent sensing films is enhanced or weakened. The test result is determined by the magnitude of the change in fluorescence intensity.

Figure 5:
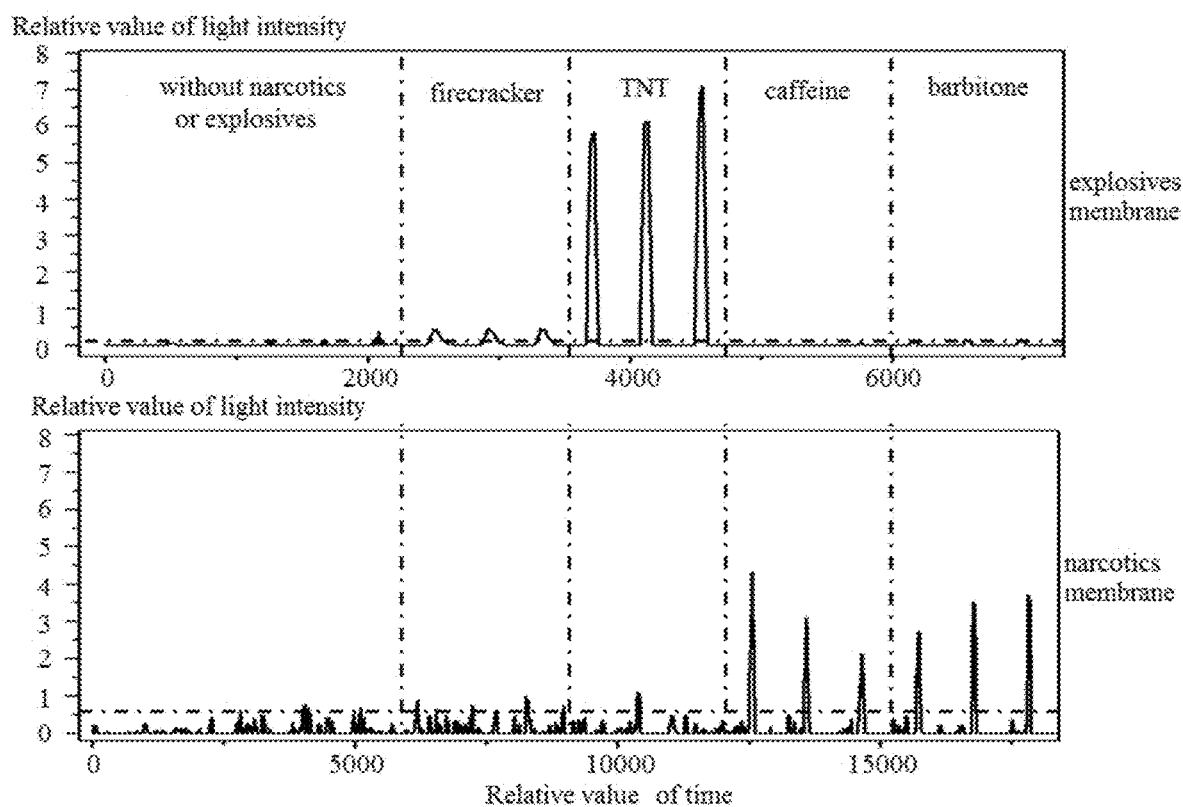
FIG. 5 is a result chart of simultaneously detecting several narcotics and explosives by using the double-laminated fluorescent sensor according to a second embodiment of the present invention.

FIG. 5 is a result chart of simultaneously detecting several narcotics and explosives by using the double-laminated fluorescent sensor according to a second embodiment of the present invention. The second embodiment of the present invention is a preliminary development of the first embodiment of the present invention. Although there are respective optical sensing systems, one air inlet and one air pumping port are shared to simultaneously detect or mutually verify two kinds of detected substances, thereby increasing the detecting ability.

In summary, the expansion direction of the present invention may be that the respective sensing systems are simply distributed in parallel, that is, there are respective optical sensing systems and air chambers, but share the same air inlet and the air pumping port; or may share the same air chamber, the excitation light source and the photodiode to achieve high integration; of course, it is also able to be partially integrated, partially integrated, and finally achieve highly integrated array-stacked sensors, simultaneously or alternately detecting multiple types of substances without interfering with each other.

Finally, the above description merely shows some of the embodiments of the present invention, and all changes and developments made with reference to the structures and optical sensing systems mentioned in the present invention are the subject of the present invention.

What is claimed is:

1. A laminated fluorescent sensor, comprising:
   a sealable sensor housing;
   at least one optical sensing system embedded inside the sealable sensor housing;
   an air intake passage; and
   an air pumping passage;
   wherein:
   the at least one optical sensing system comprises a light source, a short wave pass filter, an air chamber, a sensing unit, a long wave pass filter set, an optical signal collecting unit, and a signal processing system from top to bottom all of which are coaxially set, the optical signal collecting unit is connected with the signal processing system; and
   the sealable sensor housing comprises an air inlet and an air pumping port, the air inlet is communicated with the air chamber through the air intake passage, the air chamber is communicated with the air pumping port through the air pumping passage.

2. The laminated fluorescent sensor according to claim 1, wherein the light source comprises a straw-hat-shaped LED (light emitting diode) lamp, a bullet-shaped LED lamp, or a patch-type LED lamp, wherein a divergence angle of the light source is in a range of 7 to 30 degrees.

3. The laminated fluorescent sensor according to claim 2, wherein:
   the sealable sensor housing further comprises an upper housing and a lower housing, wherein the upper housing is embedded inside the lower housing,
   the sealable sensor housing further comprises a threaded hole for communicating the upper housing with the lower housing and a screw installed within the threaded hole;
   the sealable sensor housing further comprises a light source holder, the light source is fixed to the light source holder, the light source holder and the short wave pass filter are embedded inside the upper housing; the sensing unit, the long wave pass filter set and the optical signal collecting unit are embedded inside the lower housing, the signal processing system and a bottom of the lower housing are sealed.

4. The laminated fluorescent sensor according to claim 1, wherein the optical signal collecting unit comprises a PIN-type photodiode.

5. The laminated fluorescent sensor according to claim 1, wherein the short wave pass filter has a transmittance larger than 30% and an OD (optical density) in a range of 4 to 6.

6. The laminated fluorescent sensor according to claim 1, wherein the long wave pass filter set comprises a narrow band filter and a long wave pass filter, or the long wave pass filter set comprises multiple misaligned narrow band filters, a thickness of the long wave pass filter set is in a range of 2 to 5 mm.

7. The laminated fluorescent sensor according to claim 1, wherein an angle between an outlet of the air intake passage and the sensing unit is in a range of 10 to 50 degrees, an angle between an inlet of the air pumping passage and the sensing unit is in a range of 10 to 50 degrees, or the outlet of the air intake passage and the inlet of the air pumping passage are provided 0.2 to 1 mm above a tangential direction of an edge of the sensing unit.

8. The laminated fluorescent sensor according to claim 1, wherein the at least one optical sensing system comprises multiple optical sensing systems, the multiple optical sensing systems are embedded inside the sealable sensor housing in parallel, the air inlet and the air pumping port are respectively provided at two sides of the air chamber.

9. The laminated fluorescent sensor according to claim 1, further comprising:
   a micro vacuum pump, wherein the air pumping port is connected with the micro vacuum pump; the at least one optical sensing system further comprises a transparent optical window provided between the short wave pass filter and the air chamber.

* * * * *